United States Patent [19]

Blatchford

[11] 4,385,861
[45] May 31, 1983

[54] LOAD HANDLING APPARATUS

[75] Inventor: Michael I. Blatchford, Radstock, nr. Bath, England

[73] Assignee: Ralph Blatchford & Company Limited, Avon, England

[21] Appl. No.: 211,293

[22] Filed: Nov. 28, 1980

[30] Foreign Application Priority Data

Nov. 30, 1979 [GB] United Kingdom ............... 7941436

[51] Int. Cl.³ .................... B60P 1/54; B66C 7/10
[52] U.S. Cl. .................... 414/542; 212/75; 212/182; 294/81 SF; 414/342
[58] Field of Search ............ 414/341, 342, 345, 347, 414/348, 496, 486, 467, 542, 608; 212/182, 75, 189, 183–188; 294/81 SF, 67 DA

[56] References Cited

U.S. PATENT DOCUMENTS

| | | |
|---|---|---|
| 3,448,874 | 6/1969 | Martinson ............... 414/542 |
| 3,602,375 | 8/1971 | Martinson ............... 414/542 X |
| 3,982,644 | 9/1976 | Pease ..................... 294/81 SF X |
| 3,990,714 | 11/1976 | Hornagold ............... 212/189 X |
| 4,219,122 | 8/1980 | Blatchford ............... 414/542 X |
| 4,234,287 | 11/1980 | Lassig et al. ............ 212/182 X |

FOREIGN PATENT DOCUMENTS

| | | |
|---|---|---|
| 1237281 | 3/1967 | Fed. Rep. of Germany ...... 212/182 |
| 2440182 | 3/1976 | Fed. Rep. of Germany ...... 414/542 |
| 1163241 | 9/1969 | United Kingdom . |

Primary Examiner—Bruce H. Stoner, Jr.
Attorney, Agent, or Firm—Cushman, Darby & Cushman

[57] ABSTRACT

A load handling apparatus includes a vehicle, a pair of mounting frames each hingedly mounting a pedestal for movement from an inoperative position, in which the pedestals are folded down horizontally about hinges so as to lie lengthwise of the vehicle, to an operative upright position. Each pedestal mounts a respective transverse foldable track which in use extends horizontally and on which a respective carriage is movable. Each carriage mounts a vertical telescopic mast with a head and chains, such that telescopic operation of the masts raises or lowers top lift beams for handling a load. The apparatus includes laterally movable jacks for use as stabilizers. In the inoperative position with the pedestals, tracks and masts folded down horizontally and lengthwise, the vehicle is of compact height and width.

9 Claims, 9 Drawing Figures

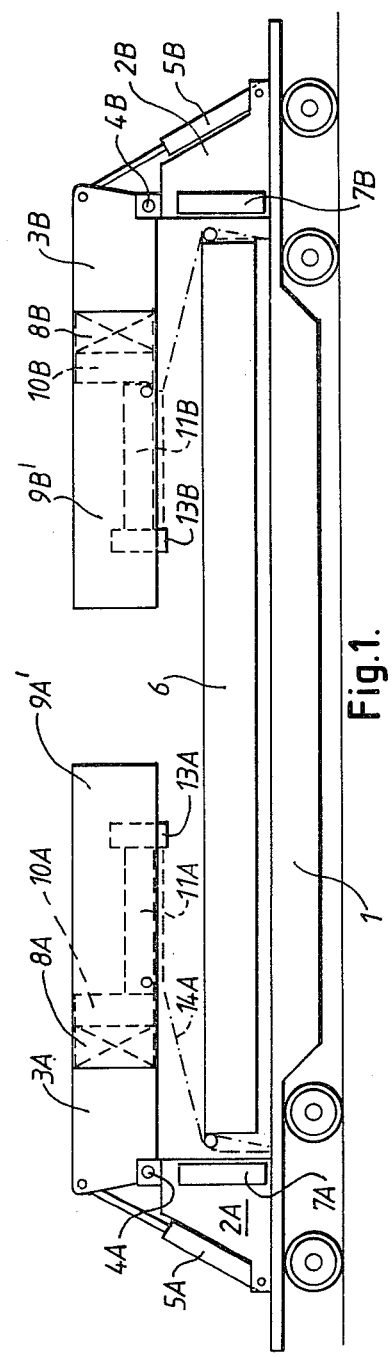
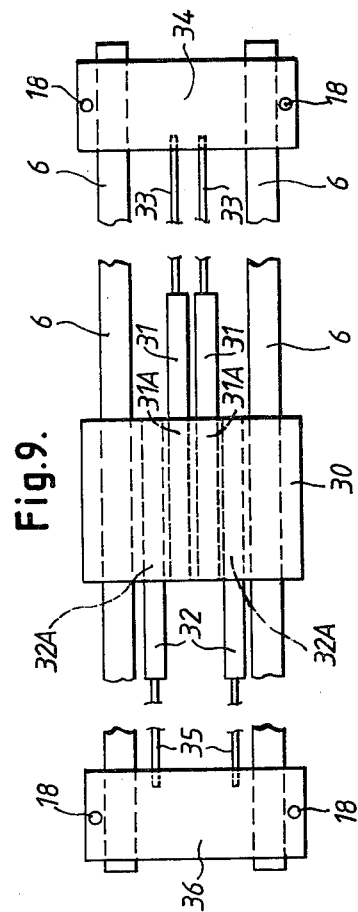
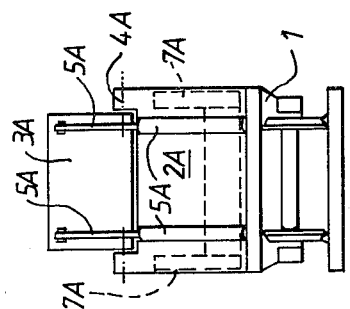

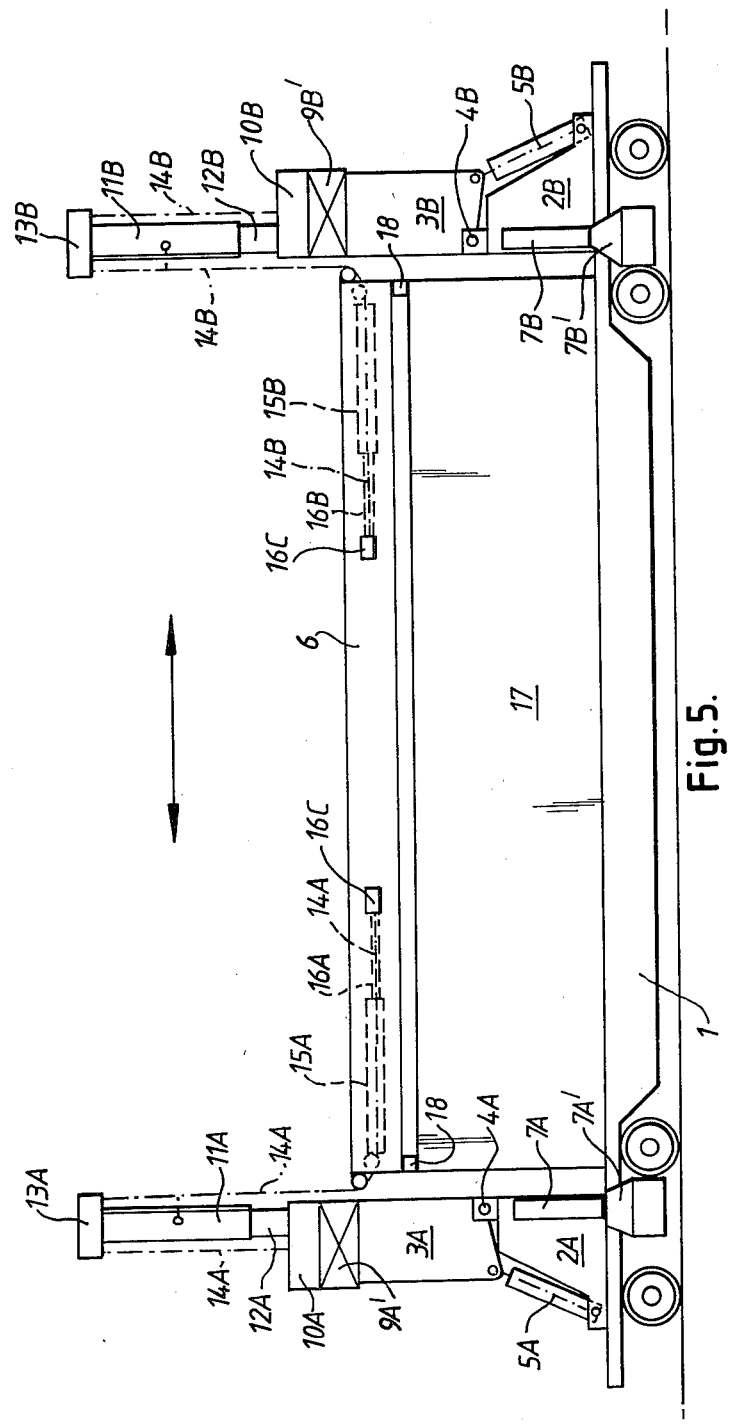

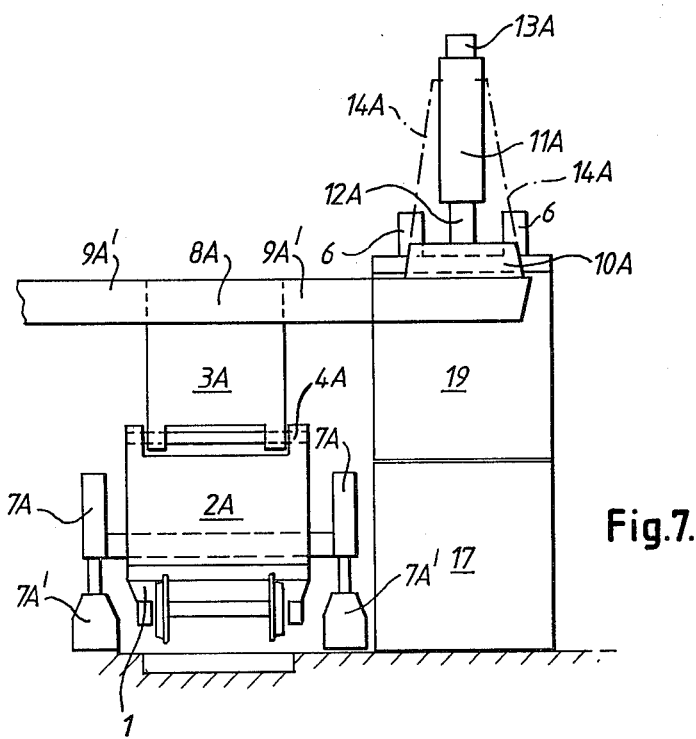
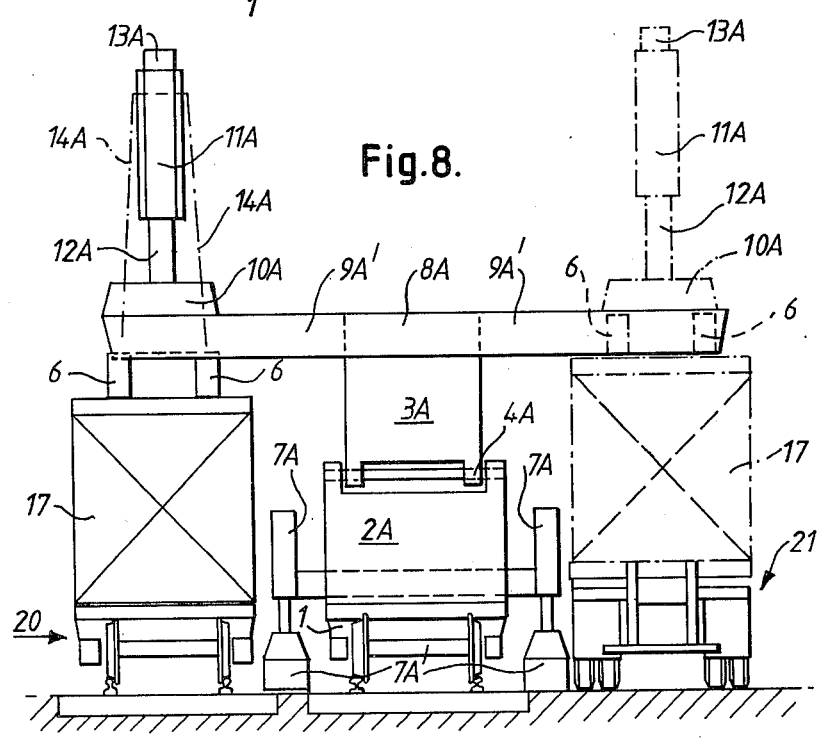

LOAD HANDLING APPARATUS

FIELD OF THE INVENTION

This invention relates to load handling apparatus. Containerisation of goods for transport is well known and widely used, and there are already known various forms of apparatus for loading and unloading containers, for example from and to road vehicles (trucks) and rail vehicles (wagons).

Although this invention is primarily concerned with the handling of containers, it is not limited to that use and may be applied to the handling of other loads. Also, although the invention will be described herein by way of example as relating to load handling apparatus including a railway vehicle, it is not limited to a railway vehicle, and may instead apply to road or other vehicles, for example hovercraft.

It is an object of this invention to provide load handling apparatus which includes a railway wagon or other vehicle and will allow ready handling of a container, and yet which will be of limited overall size, so as to enable a rail vehicle for instance to operate over normal rail tracks within their normal limits as to height and width.

SUMMARY OF THE INVENTION

According to this invention load handling apparatus comprises a vehicle and means mounted on the vehicle for raising and lowering a load and for moving the load laterally of the vehicle, the said means including at least one base member which is essentially upright when in an operative load-handling position, characterised in that the said at least one base member is movable from the upright operative load-handling position into an inoperative position in which the said at least one base member extends in the length direction of the vehicle.

BRIEF DESCRIPTION OF THE DRAWINGS

FIG. 1 is a side elevation of container handling apparatus including a railway wagon (which could be self-propelled); the apparatus is shown in its inoperative, folded-down position;

FIG. 2 is an end elevation corresponding to FIG. 1;

FIG. 5 is a side elevation showing the apparatus in its operative, fully unfolded position and carrying a container;

FIG. 7 is a view similar to FIG. 6 but showing one container being stacked on another container which has already been placed on the ground;

FIG. 8 is another view similar to FIG. 6 but showing the apparatus being used for transferring a container from a railway wagon to a road vehicle or vice versa; and FIG. 9 is a diagrammatic underneath plan view, with parts broken away, showing a pair of beams, with load connecting devices and operating rams.

DESCRIPTION OF THE PREFERRED EMBODIMENT

Figure 6:
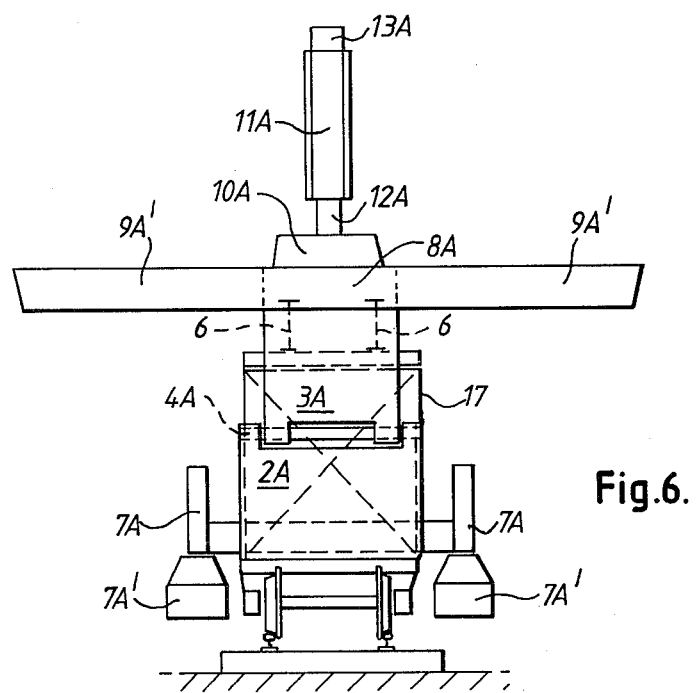
FIG. 6 is an end elevation corresponding to FIG. 5.

Referring to the drawings, a railway wagon 1 carries at each end an upwstanding frame 2A, 2B, each frame mounting a base member on pedestal 3A,3B by means of a hinge 4A, 4B. Each pedestal 3A, 3B is movable angularly downwards from an upright operative load-handling position (FIGS. 4 to 8) into an inoperative folded down position (FIGS. 1 and 2) by pairs of hydraulic rams 5A, 5B. In the inoperative position each pedestal 3A, 3B extends horizontally in the length direction of the wagon 1. As FIG. 1 shows, a top lift beam or beams 6 may be carried lengthwise between the frames 2A, 2B. Also shown diagrammatically are two pairs of hydraulic jacks 7A, 7B (one pair at each end of the wagon) which are carried inboard (FIGS. 1 and 2) when the vehicle is travelling, but are moved outboard for stabilising the apparatus when in use (see FIGS. 3 to 8). These jacks are mounted so as to be telescopically movable inboard and outboard (see FIGS. 2, 4 and 6) so that they can be moved outboard to a required distance for maximum stability of the apparatus. In FIGS. 5 and 6 the jacks are shown extended outboard, but vertically retracted; in these Figures it is assumed that the wagon 1 is travelling only a short distance, for example in a railway yard, for moving a container from one location to another, without the need to move the jacks fully inboard. In a modified embodiment, the jacks 7A, 7B are omitted and are replaced by suitable counterweights movably mounted on laterally extending beams. Thus when a container is moved laterally of the wagon 1, the counterweights are moved laterally in the opposite direction, to the amount necessary to stabilise the load. This modified embodiment avoids the need for site preparation, which is sometimes required when using the jacks 7A, 7B.

Each pedestal 3A, 3B mounts at its end (which is the upper end when upright) load lifting mechanism in the form of a track and crane structure, comprising a central fixed tracked beam 8A, 8B with oppositely foldable track members 9A', 9B'. In FIGS. 1 to 4 these track and crane structures are shown in their folded state. FIG. 4 also shows in dashed lines the unfolded state, in which the track members are lowered, to form a continuous horizontal trackway adjacent each end of the wagon 1, see also FIGS. 5 to 8.

Mounted to run on the trackways are respective cranes each having a carriage 10A, 10B on which is mounted load supporting means including a telescopically extensible mast 11A, 11B and a beam or beams 6. Each crane can be propelled (by known mechanism not shown) along its respective trackway, to assume any required position, see FIGS. 7 and 8. Each crane has a lower portion 12A, 12B and a head portion 13A, 13B, the head portions carrying pulleys (not shown) over which run chains 14A, 14B (one pair for each crane). Each chain is anchored at one end to a respective carriage 10A, 10B and at the other end is connected to a top lift beam 6 by means of a hydraulic ram 15A, 15B (FIG. 5) for taking up the slack of the chains, as may be required during some operating conditions. These rams have their piston rods 16A, 16B extending oppositely and inwardly as shown and the chains are anchored to the free ends 16C of the piston rods. The chains run over pulleys on the beams 6, FIG. 5.

Figure 3:
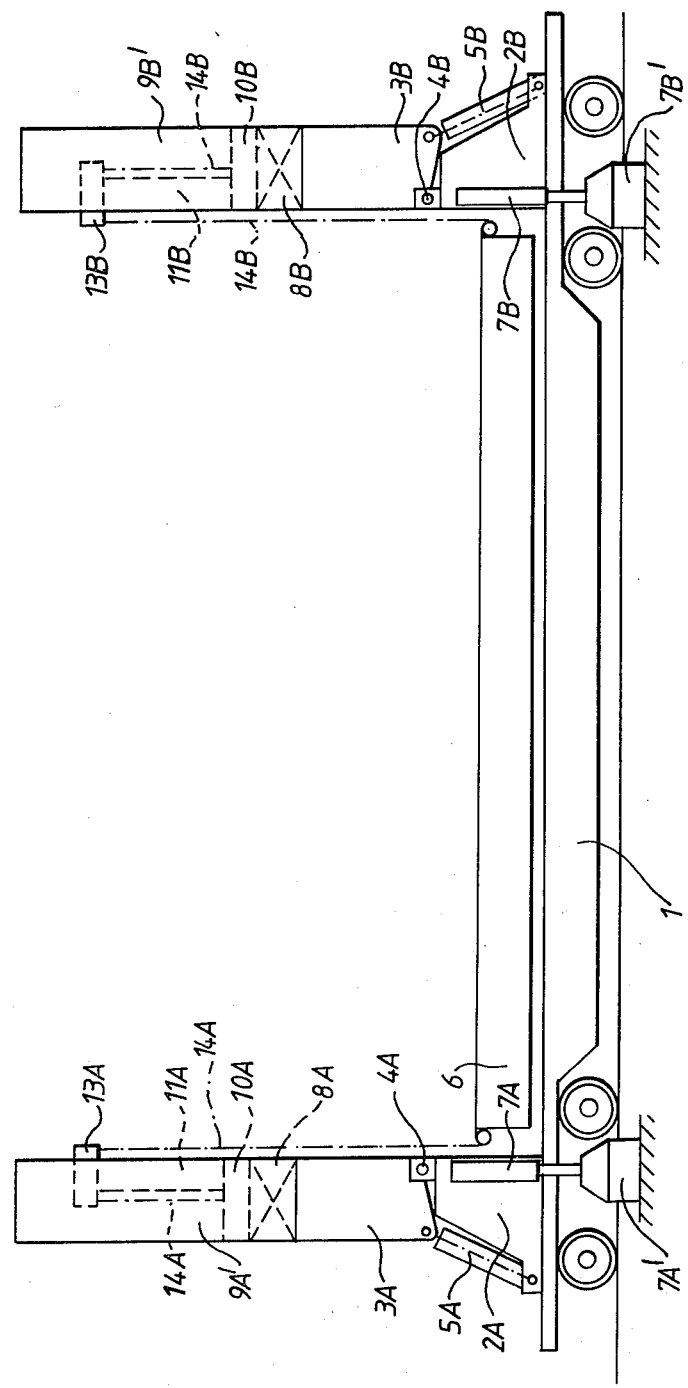
FIG. 3 is a side elevation, showing the apparatus in an intermediate stage of unfolding.
Figure 4:
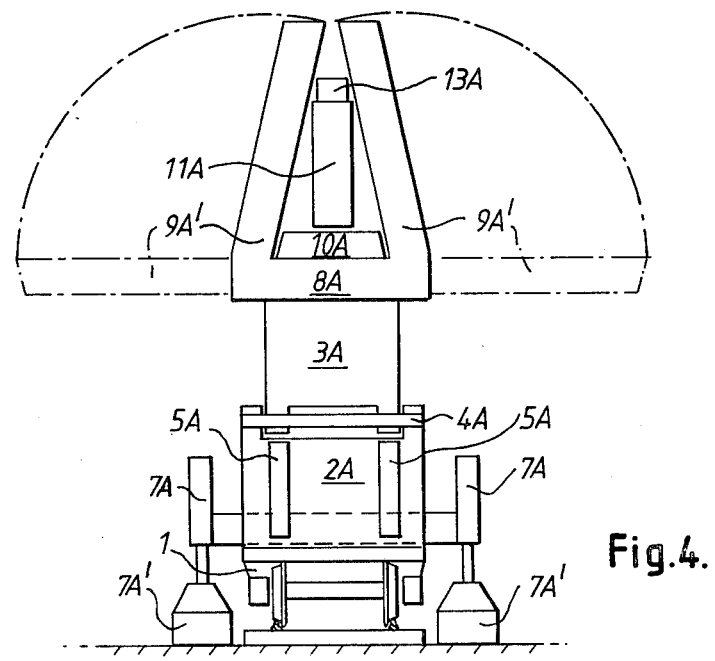
FIG. 4 is an end elevation corresponding to FIG. 3.

To lift the beams 6 from the FIG. 3 position to a first lifted position, the masts 11A, 11B are telescopically upwardly extended to raise the chains sufficiently to lift the beams. To lift the beams further, for example to the position shown at the right of FIG. 7, the masts are extended telescopically still further. Although a telescoping mast arrangement is described above, it would also be possible to use a crane having a winch. It is to be understood that the drawings are diagrammatic and are not intended to show the various movements accurately.

FIGS. 1 and 2 show the inoperative, travel state of the apparatus. FIG. 3 shows the stationary position, with the pedestals 3A, 3B raised up, with the track members 9A' and 9B' not folded down, and with the jacks 7A,7B moved out laterally and extended downwards (see also FIG. 4) and with ground engaging stabiliser feet 7A', 7B'. These feet may be carried on the wagon and then be placed in the positions shown when required. FIG. 4 also shows the stationary position, and indicates how the tracked extensions are swung outwardly and downwardly into their horizontal operative positions.

FIGS. 5 and 6 show that the masts 11A, 11B have been telescopically extended to raise the beams 6 high enough to extend lengthwise over a long container 17, which is attached to the beams for lifting or lowering by load connecting devices in the form of twist-lock devices 18. These Figures also show that the jacks 7A, 7B have been retracted whilst still outboard, to lift the feet 7A', 7B' up from the ground, so that the wagon 1 with the container 17 can be moved from one location to another in a railway goods yard, for example. Also FIG. 5 shows the piston rods 16A, 16B fully extended to keep the chains 14A,14B tight.

FIG. 7 shows that the apparatus can be operated, by raising the beams 6 still higher (with retraction as necessary of the rams 15A, 15B), to load a second container 19 on top of the container 17 which has already been placed on the ground, or alternatively to remove the container 19 from the container 17.

FIG. 8 shows that the apparatus can be used to transfer a container 17 from a railway wagon 20 to a road vehicle 21, by raising the container with the crane structures in the left hand position shown, then moving the carriages 10A, 10B across the track members 9A', 9B' to the right hand position shown in dashed lines, and finally lowering the container on to the vehicle 21.

Although FIG. 5 shows a long container, the apparatus of the invention can be modified to handle shorter containers. The beams 6 can form part of a unitary frame below which are mounted spaced parallel cross beams, mounted by rollers or slides for movement lengthwise of the wagon 1. These parallel cross beams are of sufficient transverse length to extend completely across a container, which would be attached to them by known twist-lock connections. The parallel cross beams are adjustably movable towards or away from one another, according to the size of a container to be handled. One suitable mechanism for carrying out this adjusting movement is shown in FIG. 9 and comprises a cross-head 30, mounted by rollers or slides (not shown) for movement along and below the beams 6, and two pairs of hydraulic rams 31, 32 with their cylinders 31A, 32A mounted on the cross-head 30. These four rams extend parallel to each other and parallel to the beams 6, and are spaced apart in the transverse direction, one beside another, as shown. The two piston rods 33 of one pair of rams 31 extend in one direction, with the outer ends of the rods connected to one parallel cross beam 34, while the two piston rods 35 of the other pair of rams 32 extend in the other direction, with the outer ends of the rods connected to the other parallel cross beam 36. With piston strokes of appropriate length and with selective operation of the pairs of rams, a variety of spacings of the two parallel cross beams 34, 36 can be achieved, according to the size of a container. This mechanism permits precise adjustment of the locations of the paarallel cross beams. Thus, it is possible to set the parallel cross beams at a particular spacing, for example for a short container, and then to move the whole as a unit along the beams 6 to a precise location, for loading or unloading the container at a particular place. Since the hydraulic rams are in pairs, the cross beams can always be maintained parallel.

In another embodiment, a top lift beam structure could be designed for operation with a single size of a container only, and yet provide for lengthwise manipulation of the container to a required location.

Apparatus in accordance with the invention has various advantages, some of which are as follows:

Due to the lengthwise position of the pedestals and cranes in the inoperative position (FIG. 1) they occupy space within the limits permitted by normal railway practice. At the same time they permit a top lift beam or beams also to be stowed on the wagon 1. The wagon can therefore travel on a railway in the normal manner.

Due to the fact that the crane structure trackways, in their operative position, are at the top of the pedestals, they are above a load to be lifted, which is therefore approached from above by the beams 6 and the associated lifting gear. This avoids the need for space to be left between longitudinally adjacent containers which are to be lifted, for example. In other words, if there is a row of say three containers lying closely end to end on the ground beside a railway track, the present apparatus can be moved alongside the central container and lift it, despite the fact that there are no spaces between the three adjacent containers.

The crane structure trackways in effect constitute cantilevers which extend out over a load or loads, see for instance FIG. 8, and thus do not require any outboard supports or legs. In general the weight of the load handling apparatus which includes the wagon or other vehicle, would be sufficient to counteract the weight of a load being lifted, but if necessary additional ballast could be incorporated.

Although in the embodiment described above there are shown track members 9A' and 9B' extending in both lateral directions, it would be possible to design the apparatus with a track member extending to one side only of the apparatus, in applications where double-sided operation was not required. Another variation of the track members is that each could be a laterally telescopically collapsible structure, rather than an angularly upwardly and downwardly movable structure as described above.

I claim:

1. Load-handling apparatus including a vehicle and means mounted on the vehicle for raising and lowering a load and for moving the load laterally of the vehicle, wherein:
    (i) the said means comprises two spaced load-handling structures each of which when in an operative position is essentially upright and has at least one track member extending essentially horizontally and laterally of the vehicle;
    (ii) each load-handling structure comprises a base member, which is essentially upright in the operative position, with each track member extending from the upright base member;
    (iii) each base member is movable from the upright operative position down into an inoperative position in which it extends lengthwise of the vehicle;

(iv) each track member is mounted on the respective base member in such manner that each track member is movable from the operative position to the inoperative position in which latter position each track member extends lengthwise of the vehicle and of the respective base member.

2. Apparatus according to claim 1 wherein each base member is movable angularly downwards from the upright operative position down into the inoperative position in which it extends essentially horizontally.

3. Apparatus according to claim 1 wherein each base member is pivotally mounted on a frame upstanding from the vehicle.

4. Apparatus according to claim 1 wherein each load handling structure comprises a pair of the said track members which are oppositely foldable, a carriage, and load supporting means carried by the carriage, the track members being mounted on the base member for angular movement from an inoperative position aligned with the base member into an operative position in which they extend horizontally oppositely from the base member and in which operative position the carriage is movable horizontally and laterally of the vehicle on either track member.

5. Apparatus according to claim 4, wherein each base member includes a track portion which, in the operative position of the track members, constitutes with the track members a single continuous trackway.

6. Apparatus according to claim 1, wherein:
the load handling structures carry at least one beam each said beam of which
 (a) includes means for suspending a load from the at least one beam,
 (b) is disposed lengthwise of the vehicle and
 (c) in the inoperative position of the base members is disposed below the base members.

7. Apparatus according to claim 6 having two said load carrying beams, spaced load connecting devices slidably mounted on the beams, and rams mounted by the beams and connected to the load connecting devices, such that by operation of the rams the connecting devices can be adjustably moved along the beams.

8. Apparatus according to claim 7 having four parallel rams, two of the rams having piston rods extending in one direction lengthwise of the beams and the other two rams having piston rods extending in the opposite direction lengthwise of the beams.

9. Apparatus according to claim 8 wherein the rams are mounted on a crosshead which is movably carried by the beams.

* * * * *